(12) United States Patent
Ueno et al.

(10) Patent No.: US 7,978,048 B2
(45) Date of Patent: Jul. 12, 2011

(54) KEYLESS ENTRY SYSTEM

(75) Inventors: Hideki Ueno, Miyagi-ken (JP);
Noritoshi Yuzuriha, Tokyo (JP);
Tatsuya Michishige, Tokyo (JP)

(73) Assignees: Alps Electric Co., Ltd., Tokyo (JP);
Fuji Heavy Industries Ltd., Tokyo (JP)

( * ) Notice: Subject to any disclaimer, the term of this patent is extended or adjusted under 35 U.S.C. 154(b) by 1022 days.

(21) Appl. No.: 11/363,832

(22) Filed: Feb. 27, 2006

(65) Prior Publication Data

US 2006/0197379 A1     Sep. 7, 2006

(30) Foreign Application Priority Data

Mar. 2, 2005   (JP) ................... 2005-058005

(51) Int. Cl.
 G05B 19/00  (2006.01)
 G06F 7/00   (2006.01)
 G08B 29/00  (2006.01)
 H04B 1/00   (2006.01)
(52) U.S. Cl. .. 340/5.22; 340/5.64; 340/3.9; 340/426.28; 307/10.2; 307/9.1
(58) Field of Classification Search .............. 340/5.22, 340/5.21, 5.64, 3.9, 426.28; 307/10.2, 9.1; 180/287
See application file for complete search history.

(56) References Cited

U.S. PATENT DOCUMENTS

| | | | | |
|---|---|---|---|---|
| 5,379,033 A | * | 1/1995 | Fujii et al. ................... | 340/5.64 |
| 5,619,191 A | * | 4/1997 | Lambropoulos et al. .... | 340/5.22 |
| 5,850,174 A | * | 12/1998 | DiCroce et al. .......... | 340/426.28 |
| 5,912,631 A | * | 6/1999 | Kusunoki ................... | 340/5.64 |
| 6,133,646 A | * | 10/2000 | Segawa et al. .............. | 307/10.1 |
| 6,218,929 B1 | * | 4/2001 | Furuta et al. .................. | 340/5.2 |
| 6,281,599 B1 | * | 8/2001 | Murakami et al. .......... | 307/10.2 |
| 6,396,389 B1 | | 5/2002 | Nakano et al. | |
| 6,573,615 B1 | * | 6/2003 | Asakura et al. ............... | 307/9.1 |
| 6,778,064 B1 | * | 8/2004 | Yamasaki ................... | 340/5.21 |
| 6,980,094 B2 | * | 12/2005 | Matsubara et al. ...... | 340/426.28 |
| 7,332,997 B2 | * | 2/2008 | Shirai et al. ................... | 340/3.9 |

FOREIGN PATENT DOCUMENTS

| | | |
|---|---|---|
| JP | 11-81764 | 3/1999 |
| JP | 2912085 | 4/1999 |

\* cited by examiner

*Primary Examiner* — Brian A Zimmerman
*Assistant Examiner* — Nam V Nguyen
(74) *Attorney, Agent, or Firm* — Brinks Hofer Gilson & Lione (57) ABSTRACT

A keyless entry system includes a portable transmitter that transmits a lock signal and an unlock signal, each of which contains a unique identification code, for a predetermined period, and an operation unit that locks and unlocks doors of a vehicle in response to the lock signal and the unlock signal from the portable transmitter. The operation unit includes a receiver that outputs a lock command signal or an unlock command signal having a predetermined time length, and a controller that drives an actuator to lock or unlock the doors of the vehicle in response to the lock command signal or the unlock command signal from the receiver. The time length of the unlock command signal from the receiver is shorter than the time length of the unlock signal from the portable transmitter.

12 Claims, 5 Drawing Sheets

KEYLESS ENTRY SYSTEM

BACKGROUND OF THE INVENTION

1. Field of the Invention

The present invention relates to a keyless entry system that locks and unlocks doors of a vehicle by signal transmission from a portable transmitter, and more particularly, to a keyless entry system that can properly perform locking and unlocking even when the portable transmitter is operated a plurality of times in a short time.

2. Description of the Related Art

Figure 4:
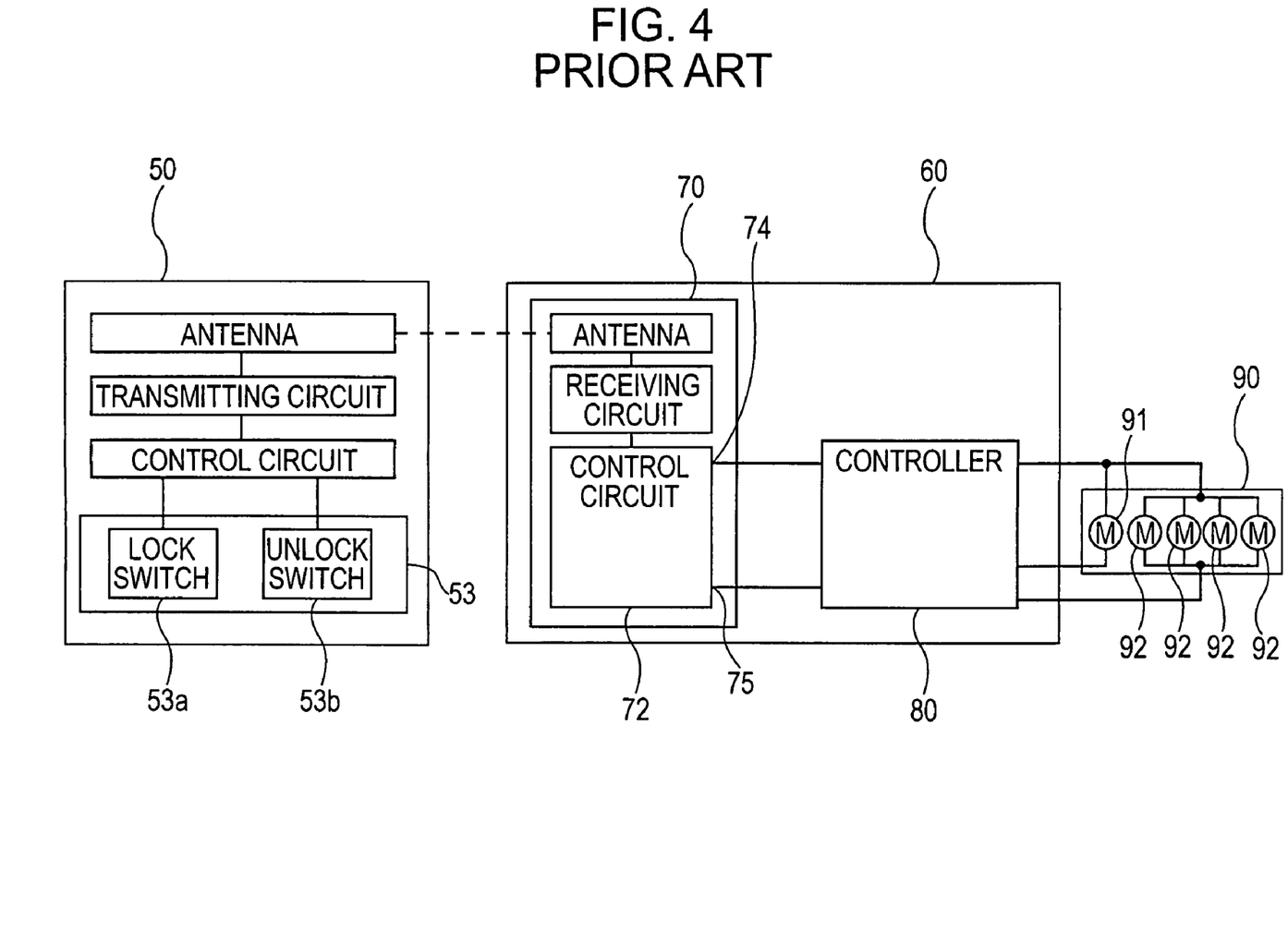
FIG. 4 is a schematic block diagram of a known keyless entry system.

FIG. 4 is a schematic block diagram of a known keyless entry system that remotely locks and unlocks doors of a vehicle, such as an automobile, by transmitting a signal from a portable transmitter to an operation unit installed in the vehicle.

The keyless entry system shown in FIG. 4 includes a portable transmitter 50 in which a unique identification (ID) code is set and which is capable of wireless communication, and an operation unit 60 installed in the vehicle to lock and unlock the doors of the vehicle in response to a lock signal and an unlock signal received from the portable transmitter 50. In the operation unit 60, for example, a receiver 70 for receiving signals from the portable transmitter 50 is connected to a controller 80 that controls the operation of the vehicle, for example, opening and closing a power window.

A lock signal and an unlock signal are transmitted by an operation switch 53 including a lock switch 53a and an unlock switch 53b. The lock switch 53a is pressed to transmit a lock signal, and the unlock switch 53b is pressed to transmit an unlock signal. Each of the lock signal and the unlock signal is transmitted from the portable transmitter 50 for 400 msec. When the receiver 70 identifies the received lock or unlock signal as a signal transmitted from the predetermined portable transmitter 50, it outputs a lock command signal of 600 msec from a lock output 74 to the controller 80 in response to the lock signal, and outputs an unlock command signal of 600 msec from an unlock output 75 in response to the unlock signal.

When a command signal of 600 msec or more is input, the controller 80 determines that a predetermined command signal is input, and then drives an actuator 90 for 600 msec to lock or unlock the doors. In the locking operation, all doors are locked in response to a first lock command signal. In the unlocking operation, only a door beside the driver's seat is unlocked when a first unlock command signal is received, and the other doors are unlocked when a second unlock command signal is received within a predetermined time (e.g., five seconds) after the reception of the first unlock command signal. That is, the controller 80 drives only a motor 91 corresponding to the driver's seat door when the first unlock command signal is input, and drives four motors 92 corresponding to three doors other than the driver's seat door and a trunk door when the second unlock command signal is input within the predetermined time.

Figure 5A:
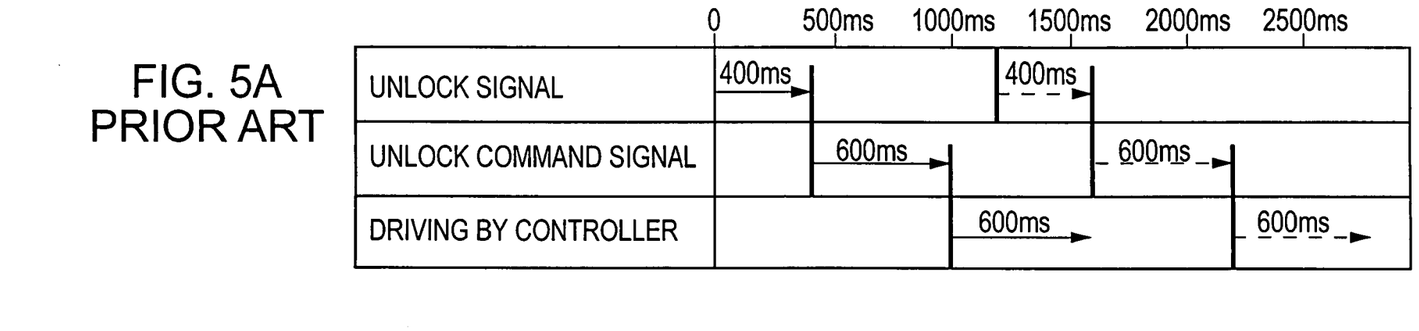
FIGS. 5A and 5B are time charts showing signals for unlocking in the known keyless entry system.
Figure 5B:
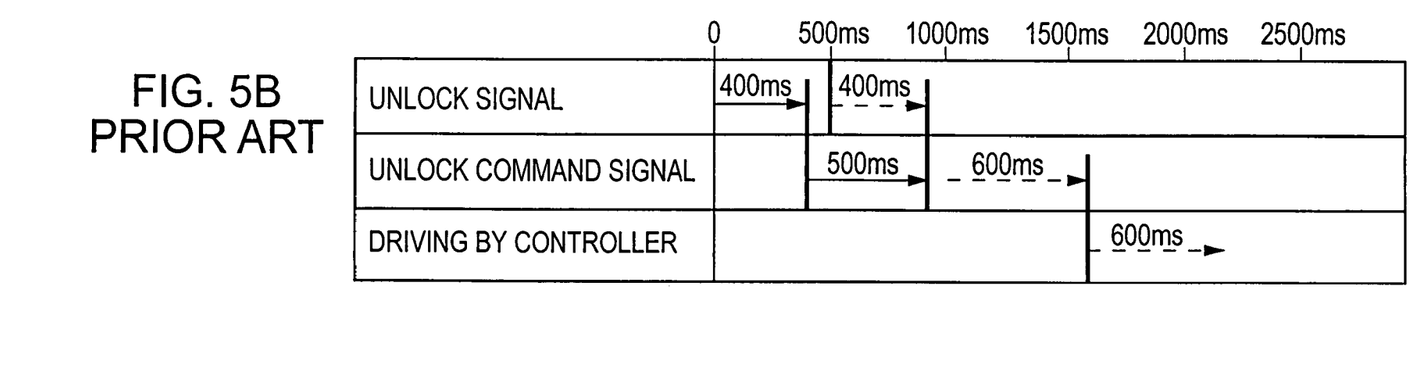

FIGS. 5A and 5B are time charts of signals for the unlocking operation. FIG. 5A shows a case in which the unlock switch 53b is pressed twice, for example, at an interval of one second or more, and FIG. 5B shows a case in which the unlock switch 53b is pressed twice, for example, at a short interval of 500 msec. Solid lines show first output signals, and broken lines show second output signals. As shown in FIG. 5A, when the unlock switch 53b is pressed twice at an interval of one second or more, the controller 80 receives a first unlock command signal output from the receiver 70 before the receiver 70 identifies a second unlock signal. Therefore, the two pressing operations do not interfere with each other. The driver's seat door can be unlocked by the first press, and the other doors can be unlocked at the second press.

However, when the unlock switch 53b is pressed twice, for example, at an interval of 500 msec, as shown in FIG. 5B, the receiver 70 finishes identification of a second unlock signal while outputting a first unlock command signal, and therefore, starts outputting a second unlock command signal immediately after a predetermined time. In this case, the output of the first unlock command signal is interrupted after the passage of 500 msec. The controller 80 does not determine the first unlock command signal as an authorized signal, but determines only the second unlock command signal as an authorized signal. For this reason, even when the unlock switch 53b is pressed twice, the controller 80 determines that the unlock switch 53b is pressed only once, and as a result, only the driver's seat door is unlocked.

In order to solve the above problem, it is conceivable to adjust the timing of transmission of signals from the portable transmitter, as disclosed in Japanese Unexamined Patent Application Publication No. 11-81764 (U.S. Pat. No. 6,396,389). However, this complicates the configuration of the system, and increases the cost and power consumption. Although it is also conceivable to transmit a signal after the preceding signal is completely transmitted, this causes a problem similar to the above-described problem.

SUMMARY OF THE INVENTION

The present invention has been made in view of the above-described problems, and an object of the invention is to provide a keyless entry system that achieves low cost and that can properly recognize the reception of authorized signals even when a door unlocking operation is performed twice in a short time.

In order to achieve the above object, a keyless entry system according to an aspect of the present invention includes a portable transmitter that transmits a lock signal and an unlock signal, each of the lock signal and the unlock signal having a predetermined time length and containing an identification code; and an operation unit that locks and unlocks doors of a vehicle in response to the lock signal and the unlock signal transmitted from the portable transmitter. The operation unit includes a receiver that receives the lock signal or the unlock signal transmitted from the portable transmitter, and that outputs a lock command signal or an unlock command signal having a predetermined time length, and a controller that drives actuators to lock or unlock the doors of the vehicle in response to the lock command signal or the unlock command signal output from the receiver. The time length of the unlock command signal is shorter than the time length of the unlock signal.

In this case, even when an unlock switch is pressed twice in a short time, the output of the first unlock command signal from the receiver is finished while the receiver is receiving the second unlock signal. Therefore, the output from the first unlock command signal is not interrupted, and it is possible to properly respond to the switch operations.

Preferably, the time length of the unlock command signal is shorter than the time length of the lock command signal.

In this case, it is possible to reliably transmit the lock command signal that needs to be securely controlled for crime prevention. Moreover, since the unlock command signal can be output for a short period, it is possible to respond to two pressing operations of the unlock switch in a short time.

Preferably, the controller drives the actuators to lock all the doors when the lock command signal is input from the receiver, drives only the actuator corresponding to a door beside a driver's seat to unlock the door beside the driver's seat when the unlock command signal is first input, and drives the actuators corresponding to the doors other than the door beside the driver's seat to unlock the doors other than the door beside the driver's seat when the unlock command signal is input again within a predetermined time.

In this case, all the doors can be reliably locked by operating the switch once. During the unlocking operation, the user can select the door to be unlocked, and therefore, convenience is enhanced.

Preferably, when the controller receives the unlock command signal from the receiver, it drives the actuators for the same period as a period in which the actuators are driven when the lock command signal is input. This makes the unlocking operation more reliable.

Preferably, the controller drives the actuators for a period corresponding to the time length of the lock command signal or the unlock command signal received from the receiver.

In this case, it is possible to reliably perform the locking operation that needs to be securely controlled for crime prevention. Moreover, since the unlocking operation can be performed in the minimum time required, power consumption is reduced.

Preferably, the time length of the unlock command signal is 400 msec or less.

Since the unlock switch is, in actuality, not pressed twice in a short period of 400 msec or less, the first signal is not cancelled even when the switch is operated a plurality of times in a short time, and it is possible to properly respond to the switch operations.

DESCRIPTION OF THE PREFERRED EMBODIMENTS

An embodiment of the present invention will be described in detail below. A keyless entry system of this embodiment is used for a vehicle such as an automobile. The keyless entry system remotely controls locking and unlocking of doors of the vehicle according to a signal containing a unique ID code and transmitted from a portable transmitter to an operation unit mounted in the vehicle.

Figure 1:
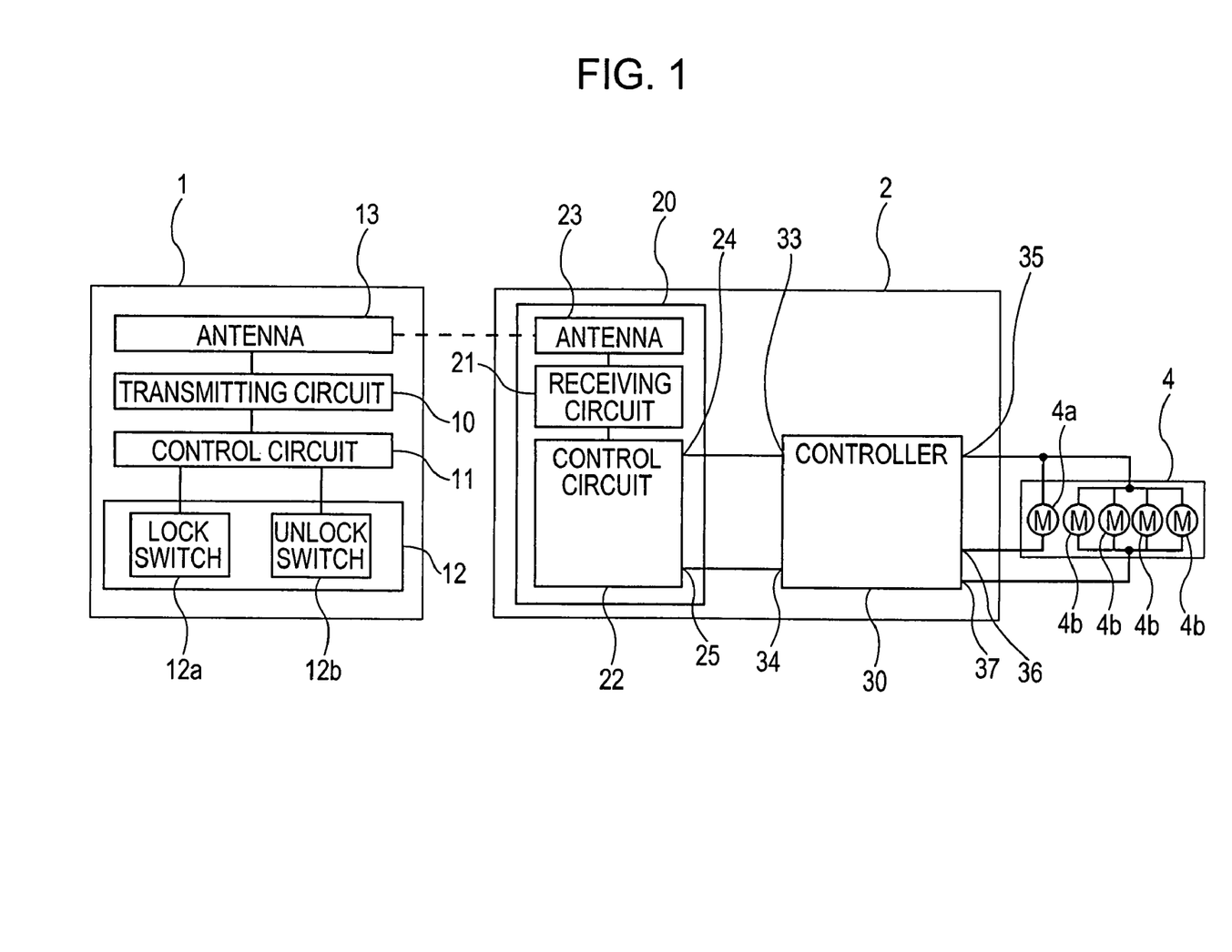
FIG. 1 is a schematic block diagram of a keyless entry system according to an embodiment of the present invention.

FIG. 1 is a schematic block diagram of the keyless entry system of the embodiment. The keyless entry system shown in FIG. 1 includes a portable transmitter 1 in which a unique ID code is set and which is capable of wireless communication, and an operation unit 2 mounted in a vehicle to receive a signal from the portable transmitter 1, and to lock or unlock doors of the vehicle when the identification code of the received signal is identified as a registered ID code.

The portable transmitter 1 includes a control circuit 11 that generates a signal containing a unique ID code, an operation switch 12 that causes the control circuit 11 to form the signal, and a transmitting circuit 10 that transmits the generated signal through an antenna 13. That is, when the operation switch 12 is operated, the control circuit 11 generates a binary command signal having a predetermined code in accordance with the operation. The generated command signal and a binary signal indicating the ID code of the portable transmitter 1 are converted into transmission signals, and are transmitted by the antenna 13 in a wireless manner. The operation switch 12 includes a lock switch 12a that causes the control circuit 11 to generate a lock command signal, and an unlock switch 12b that causes the control circuit 11 to generate an unlock command signal. The command signal generated by the control circuit 11 and the signal indicating the ID code of the portable transmitter 1 are subjected to amplitude modulation by the transmitting circuit 10, and are transmitted as a lock or unlock signal of 400 msec from the antenna 13. In this embodiment, a lock signal or an unlock signal refers to a signal that is transmitted from the portable transmitter 1 and that contains the ID code of the portable transmitter 1 as well as an lock or unlock command. The signal has a predetermined format and has a time length of 400 msec. Only after the signal of 400 msec is received by a receiver 20, all necessary information, for example, about identification of the portable transmitter and the lock or unlock command, can be confirmed. Details of the signal are well known, and the signal does not constitute the principal part of the present invention. Therefore, a detailed description of the signal is omitted.

The operation unit 2 includes a receiver 20 for receiving a lock signal or an unlock signal from the portable transmitter 1, and a controller 30 for locking or unlocking the doors of the vehicle in response to a signal from the receiver 20. The operation unit 2 drives an actuator 4 that locks or unlocks the doors of the vehicle.

The receiver 20 includes an antenna 23 for receiving a lock signal or an unlock signal from the portable transmitter 1, a receiving circuit 21 for modulating the signal received by the antenna 23, and a control circuit 22 for processing the signal modulated by the receiving circuit 21. The antenna 23 conducts communication with the portable transmitter 1, and receives a signal transmitted from a predetermined range. The received signal is output to the control circuit 22 via the receiving circuit 21.

When the control circuit 22 identifies the ID code in the signal modulated by the receiving circuit 21, it determines the signal as an authorized signal, and outputs a command signal to the controller 30. The control circuit 22 has a lock output 24 and an unlock output 25. The control circuit 22 outputs a lock command signal of 600 msec from the lock output 24 when a lock signal is transmitted from the portable transmitter 1, and outputs an unlock command signal of 200 msec from the unlock output 25 when an unlock signal is transmitted from the portable transmitter 1. Since the time length of the lock signal and the unlock signal transmitted from the portable transmitter 1 is 400 msec, the lock command signal from the receiver 20 is longer than the lock signal, and the unlock command signal from the receiver 20 is shorter than the unlock signal. The lock command signal and the unlock command signal are rectangular wave signals that is periodically placed in an ON state.

The controller 30 controls the operation of the vehicle such as opening and closing a power window. By mounting the receiver 20 in the unit of the controller 30, a keyless entry system can be easily installed in the vehicle.

The controller 30 has a lock input 33 and an unlock input 34 each for receiving a command signal from the receiver 20. When a command signal is input from the receiver 20 to the input 33 or 34 for a predetermined period, that is, when an ON signal continues for 600 msec or 200 msec, the controller 30 determines the command signal as an authorized signal, and outputs a current for driving the actuator 4 in accordance with the command signal. That is, when a lock command signal of 600 msec is input to the lock input 33, the controller 30 determines the lock command signal as an authorized signal. If an input signal continues for a period less than 600 msec, the controller 30 does not determine the signal as an authorized signal. Similarly, when an unlock command signal of 200 msec is input to the unlock input 34, the controller 30 determines the unlock command signal as an authorized signal. If an input signal continues for a period less than 200 msec, the controller 30 does not determine the signal as an authorized signal.

The controller 30 rotates the actuator 4 in a predetermined direction for 600 msec when it receives a lock command signal from the receiver 20, and rotates the actuator 4 in reverse for 600 msec when it receives an unlock command signal.

In this embodiment, when an unlock command signal is received, the actuator 4 is also driven for 600 msec, in a manner similar to that employed when a lock command signal is received. Therefore, unlocking can be performed reliably. Alternatively, the actuator 4 may be driven only for a time period corresponding to the time length of the input command signal. That is, the actuator 4 may be rotated in reverse for 200 msec when an unlock command signal is received. When the time in which the actuator 4 is driven by the operation unit 2 is determined in this way, a control soft program can be simplified. In this case, the driving time of the actuator 4 during locking is longer than during unlocking. This is because it is necessary to securely perform locking for crime prevention and to drive the actuator 4 for a sufficient time.

Unlocking operation is performed in a plurality of stages on the condition that an unlock command signal is input for a predetermined period (e.g., 5 sec). Only a predetermined door is unlocked when a first unlock command signal is input, and the other doors are unlocked when a second unlock command signal is input. In this embodiment, a door beside the driver's seat is unlocked at the input of the first unlock command signal.

In this case, the user operates the unlock switch 12b of the portable transmitter 1 only once in order to unlock the door beside the driver's seat, and operates the unlock switch 12b twice, for example, within five seconds in order to unlock all the doors.

For that purpose, as shown in FIG. 1, the controller 30 outputs a current for driving the actuator 4 from two terminals, a first terminal 36 and a second terminal 37, during the unlocking operation. The first terminal 36 is connected to a motor 4a for locking or unlocking the driver's seat door, and the second terminal 37 is connected to three motors 4b for locking or unlocking doors other than the driver's seat door and to a motor 4b for locking or unlocking a trunk door. The driver's seat door is unlocked by driving only the motor 4a when a first signal is received, and all the doors other then the drive's seat door are unlocked by driving the four motors 4b when a second signal is received, for example, within five seconds after the input of the first signal. It is not always necessary to unlock all the doors.

During the locking operation, the controller 30 outputs a current for driving the actuator 4 from the lock terminal 35. The lock terminal 35 is connected to all the motors 4a and 4b. When the controller 30 receives a lock command signal once, it drives all the motors 4a and 4b to lock all the doors.

The motors 4a and 4b are connected to lock members (not shown) that respectively lock and unlock the doors. The lock members lock the doors in association with the rotation of the motors 4a and 4b in a predetermined direction, and unlock the doors in association with the reverse rotation of the motors 4a and 4b.

Figure 2A:
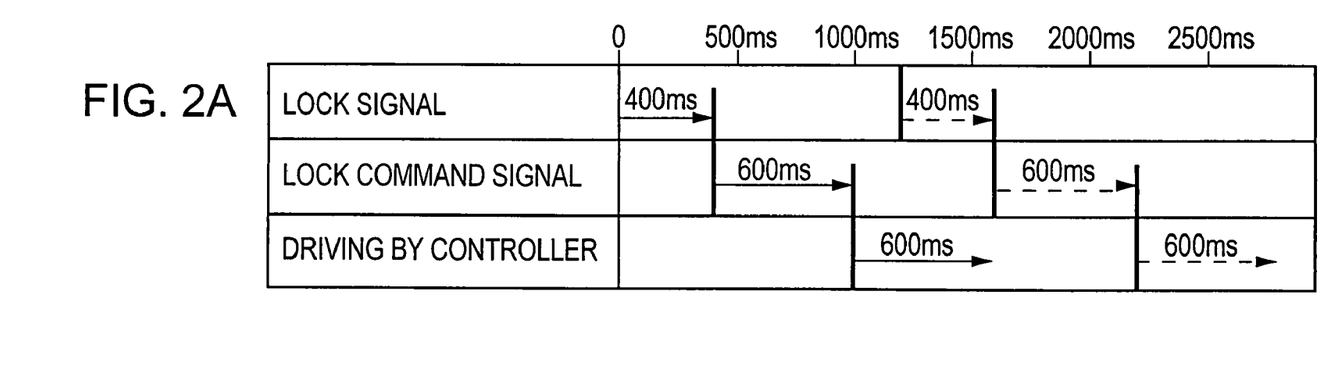
FIGS. 2A and 2B are time charts showing signals for locking in the embodiment.
Figure 2B:
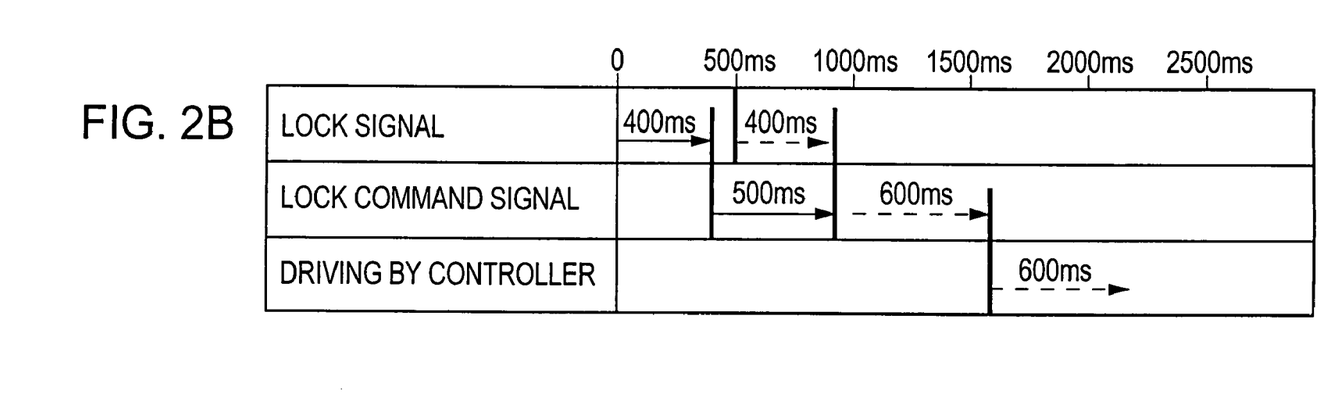
Figure 3A:
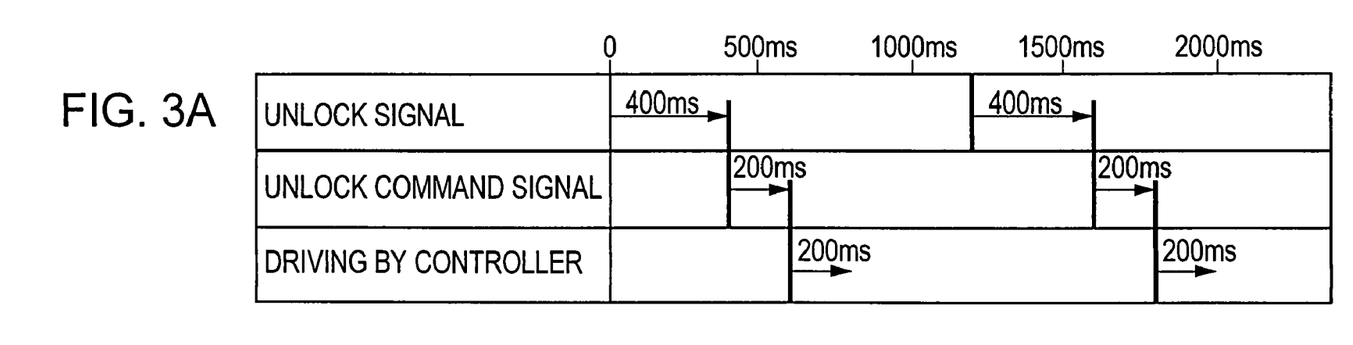
FIGS. 3A and 3B are time charts showing signals for unlocking in the embodiment.
Figure 3B:
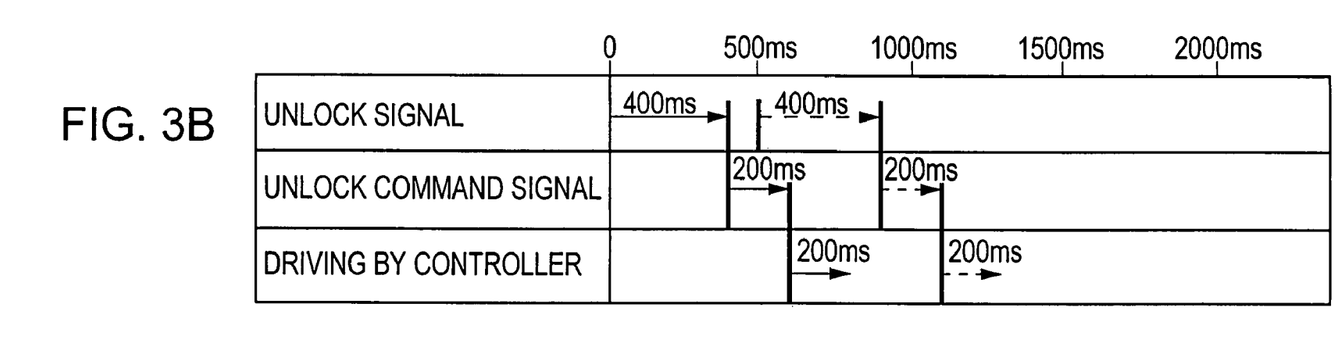

A description will now be given of operations of locking and unlocking the doors of the vehicle according to this embodiment. FIGS. 2A and 2B are time charts showing a case in which the lock switch 12a is operated, and FIGS. 3A and 3B are time charts showing a case in which the unlock switch 12b is operated.

FIG. 2A shows a case in which the lock switch 12a of the portable transmitter 1 is operated twice, for example, at an interval of one second or more. Solid lines show first output signals, and broken lines show second output signals. As shown in FIG. 2A, when the lock switch 12a is pressed twice at an interval of one second or more, the controller 30 receives the first lock command signal output from the receiver 20 before the receiver 20 identifies the second lock signal, and outputs a current for driving the actuator 4, thus locking all the doors. The controller 30 also receives the second lock command signal, and outputs a control signal to the actuator 4. In this case, however, since the doors have been already locked, the lock members do not actually move.

FIG. 2B shows a case in which the lock switch 12a is operated within a short time (e.g., at an interval of 500 msec). In this case, before a lock command signal of 600 msec is entirely input from the receiver 20 to the controller 30, identification of the second lock signal by the receiver 20 is completed. Therefore, the input of the first lock command signal to the controller 30 is interrupted (500 msec), and only a lock command signal corresponding to the second press of the lock switch 12a is determined as an authorized signal. For this reason, the control 30 drives the actuator 4 only once. If the actuator 4 is driven a plurality of times in a short time, overcurrent may be applied to the motors 4a and 4b, and this may cause malfunctioning and breakdown of the motors 4a and 4b. In contrast, in this embodiment, the actuator 4 is driven only once even when the lock switch 12a is operated a plurality of times in a short time. Therefore, a heavy load will not be imposed on the motors 4a and 4b, and safety of the system can be improved.

An unlocking operation will now be described. FIG. 3A shows a case in which the unlock switch 12b of the portable transmitter 1 is operated twice, for example, at an interval of one second or more. Solid lines show first output signals, and broken lines show second output signals. As shown in FIG. 2A, when the unlock switch 12b is pressed twice at an interval of one second or more, the controller 30 receives the first unlock command signal output from the receiver 20 before the receiver 20 identifies the second unlock signal, and the two pressing operations of the unlock switch 12b do not interfere with each other. Consequently, the door beside the driver's seat can be unlocked by the first press of the unlock switch 12b, and the other doors can be unlocked by the second press.

FIG. 3B shows a case in which the unlock switch 12b is operated twice within a short time (e.g., at an interval of 500 msec). In this case, since an unlock command signal from the receiver 20 is shorter than an unlock signal from the portable transmitter 1, the controller 30 reliably receives the first unlock command signal before the receiver 20 completely receives the second unlock signal. On receiving the entire second unlock signal, the receiver 20 outputs the second unlock command signal to the controller 30. That is, even when the unlock switch 12b is pressed twice in a short time, the output of the first unlock command signal is not interrupted, and the controller 30 determines that two unlock command signals are received. Accordingly, it is possible to perform proper operation as intended by the user. During the unlocking operation, different motors are driven between the first and second pressing operations of the unlock switch 12b. Therefore, the above-described overcurrent problem does not arise.

In this embodiment, the driver's seat door and the other doors are alternately unlocked when the unlock switch 12b is pressed within a predetermined time. Therefore, in order to drive the same motor, pressing of the unlock switch 12b needs to be repeated at least three times. Even if the unlock switch 12b is pressed at intervals of 400 msec, there is a time interval of 800 msec between the first press and the third press of the unlock switch 12b. Therefore, even when the motor is driven for 600 msec, the above-described overcurrent problem does not arise.

The unlock command signal from the receiver 20 is 200 msec, which is shorter than 400 msec, because approximately 400 msec or more is taken for normal persons to press the switch twice. That is, when the time length of the unlock command signal is set at 400 msec or less, the first press of the unlock switch 12b is not cancelled, and proper operations can be performed in response to the pressing operations. Further, the time length of the signal transmitted from the portable transmitter 1 is 400 msec, and is shorter than the time taken for normal persons to press the switch twice. Therefore, the switch is not pressed during transmission of the signal, and the transmission is prevented from being interrupted, without using a complicated structure, for example, without storing the signal in a memory. For example, when the switch is pressed twice within 450 msec, signals may be transmitted from the portable transmitter 1 at an interval of 500 msec. In this case, an operation similar to that shown in FIG. 3B is performed, and the system will not malfunction.

While the embodiment of the present invention has been described above, the present invention is not limited to the embodiment, and various modifications can be made without departing from the technical scope of the invention. For example, unlocking operation is performed in two stages in the above embodiment, it may be performed in three or more stages. Further, the combination of doors to be unlocked may be appropriately changed, for example, only a trunk door or a rear door may be unlocked.

What is claimed is:

1. A keyless entry system comprising:
a portable transmitter that transmits respectively a lock signal and an unlock signal for a predetermined length of time, each of the lock signal and the unlock signal containing an identification code; and
an operation unit that locks and unlocks doors of a vehicle in response to the lock signal and the unlock signal transmitted from the portable transmitter,
wherein the operation unit includes:
a receiver that receives the lock signal for executing locking operation once or the unlock signal for executing unlocking operation once transmitted from the portable transmitter, and that outputs a lock command signal or an unlock command signal having a predetermined time length when the received lock signal or the unlock signal has the predetermined length of time, and the identification code is identified; and
a controller that drives actuators to lock or unlock the doors of the vehicle in response to the lock command signal or the unlock command signal output from the receiver, and
wherein the time length of the unlock command signal is shorter than the time length of the unlock signal for executing unlocking operation once transmitted from the portable transmitter.

2. The keyless entry system according to claim 1, wherein the time length of the unlock command signal is shorter than the time length of the lock command signal.

3. The keyless entry system according to claim 2, wherein the controller drives the actuators to lock all the doors when the lock command signal is input from the receiver, drives only the actuator corresponding to a door beside a driver's seat to unlock the door beside the driver's seat when the unlock command signal is first input, and drives the actuators corresponding to the doors other than the door beside the driver's seat to unlock the doors other than the door beside the driver's seat when the unlock command signal is input again within a predetermined time.

4. The keyless entry system according to claim 2, wherein, when the controller receives the unlock command signal from the receiver, the controller drives the actuators for the same period as a period in which the actuators are driven when the lock command signal is input.

5. The keyless entry system according to claim 2, wherein the controller drives the actuators for a period corresponding to the time length of the lock command signal or the unlock command signal received from the receiver.

6. The keyless entry system according to claim 1, wherein the time length of the unlock command signal is 400 msec or less.

7. The keyless entry system according to claim 1, wherein the receiver outputs the lock command signal or the unlock command signal when the identification code of the lock signal or the unlock signal is identified.

8. The keyless entry system according to claim 1, wherein the unlock command signal and the signal indicating the identification code of the portable transmitter are subjected to amplitude modulation by a transmitting circuit.

9. The keyless entry system according to claim 1, wherein the controller determines that the lock or unlock command signal is an authorized signal when the input lock or unlock command signal is a signal having the predetermined time length.

10. The keyless entry system according to claim 9, wherein the lock or unlock command signal is a rectangular wave signal.

11. The keyless entry system according to claim 1, wherein the receiver receives the lock or unlock signal having the predetermined length of time and the identification code is identified, the receiver outputs the lock or unlock command signal immediately irrespective of whether the lock or unlock command signal is currently being outputted or not.

12. A keyless entry system comprising:
a portable transmitter that transmits a lock signal and an unlock signal, each of the lock signal and the unlock signal having a predetermined time length and containing an identification code; and
an operation unit that locks and unlocks doors of a vehicle in response to the lock signal and the unlock signal transmitted from the portable transmitter,
wherein the operation unit includes:
a receiver that receives the lock signal or the unlock signal transmitted from the portable transmitter, and that outputs a lock command signal or an unlock command signal having a predetermined time length when the received lock signal or the unlock signal has the predetermined length of time, and the identification code is identified; and a controller that drives actuators to lock or unlock the doors of the vehicle in response to the lock command signal or the unlock command signal output from the receiver, wherein the time length of the unlock command signal is shorter than the time length of the unlock signal, and wherein the time length of the unlock command signal is shorter than the time length of the lock command signal.

* * * * *